United States Patent
Liu et al.

(10) Patent No.: US 12,405,584 B2
(45) Date of Patent: Sep. 2, 2025

(54) GENERALIZED ESTIMATOR (GE), AND GENERALIZED DISTURBANCE REJECTION CONTROLLER (GDRC) AND DESIGN METHOD THEREOF

(71) Applicant: Tsinghua University, Beijing (CN)

(72) Inventors: Shaojie Liu, Beijing (CN); Donghai Li, Beijing (CN); Min Zhu, Beijing (CN)

(73) Assignee: Tsinghua University, Beijing (CN)

( * ) Notice: Subject to any disclaimer, the term of this patent is extended or adjusted under 35 U.S.C. 154(b) by 508 days.

(21) Appl. No.: 18/050,721

(22) Filed: Oct. 28, 2022

(65) Prior Publication Data
US 2024/0094690 A1    Mar. 21, 2024

(30) Foreign Application Priority Data
Aug. 31, 2022    (CN) .......................... 202211050253.0

(51) Int. Cl.
G05B 17/02    (2006.01)
(52) U.S. Cl.
CPC .................................. G05B 17/02 (2013.01)

(58) Field of Classification Search
CPC ....... G05B 17/02; G05B 13/04; G05B 13/042
See application file for complete search history.

(56) References Cited

U.S. PATENT DOCUMENTS

2005/0096793 A1*  5/2005  Takeuchi ............. G05B 13/047
                                                                 700/245

* cited by examiner

*Primary Examiner* — Mohammad Ali
*Assistant Examiner* — Sheela Rao
(74) *Attorney, Agent, or Firm* — SALIWANCHIK, LLOYD & EISENSCHENK

(57) ABSTRACT

The present disclosure belongs to the field of estimators, and provides a generalized estimator (GE), and a generalized disturbance rejection controller (GDRC) and a design method thereof. The GE includes an inner-loop estimation controller and a nominal model module of a controlled object. The inner-loop estimation controller transmits a control signal to the nominal model module. The nominal model module includes a nominal model of the controlled object. The GE is structurally uniform, and functionally interchangeable. With the structure of the GE, the typical disturbance rejection controller (DRC) is unified to a same control framework to obtain the GDRC that is more universal. The GDRC can design different control strategies according to existing conditions of most systems.

18 Claims, 8 Drawing Sheets

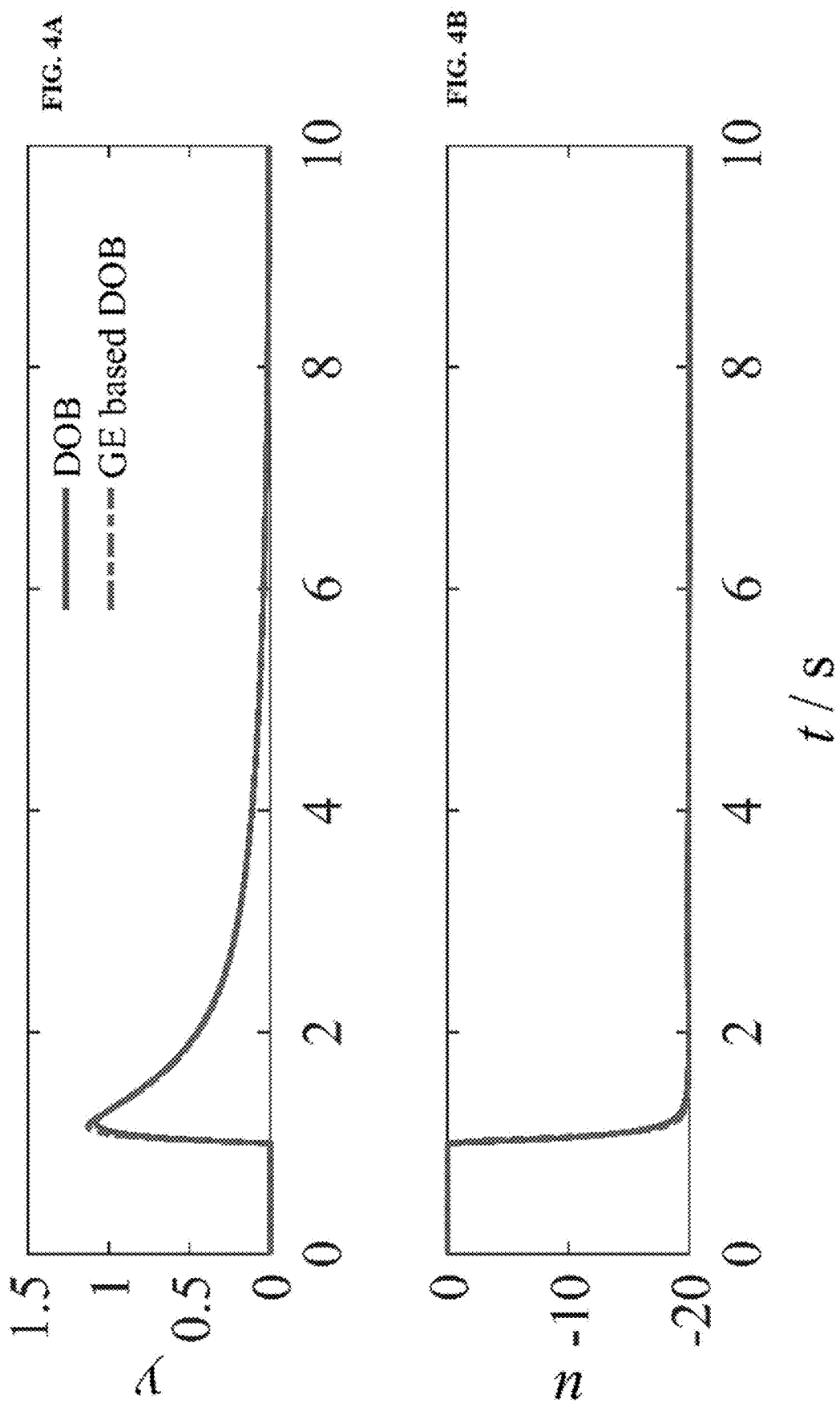

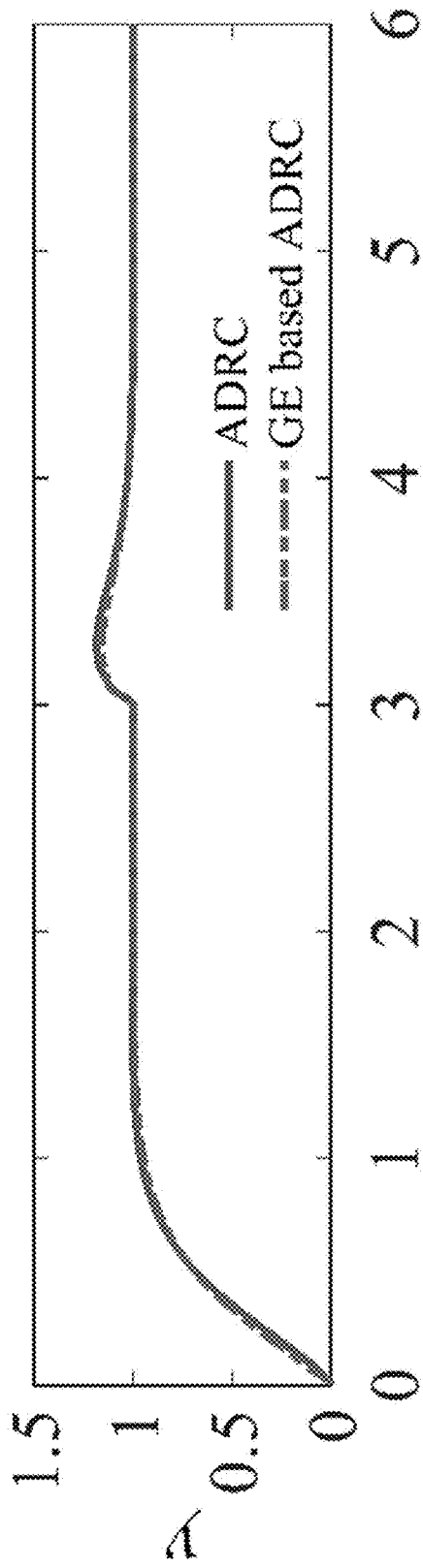
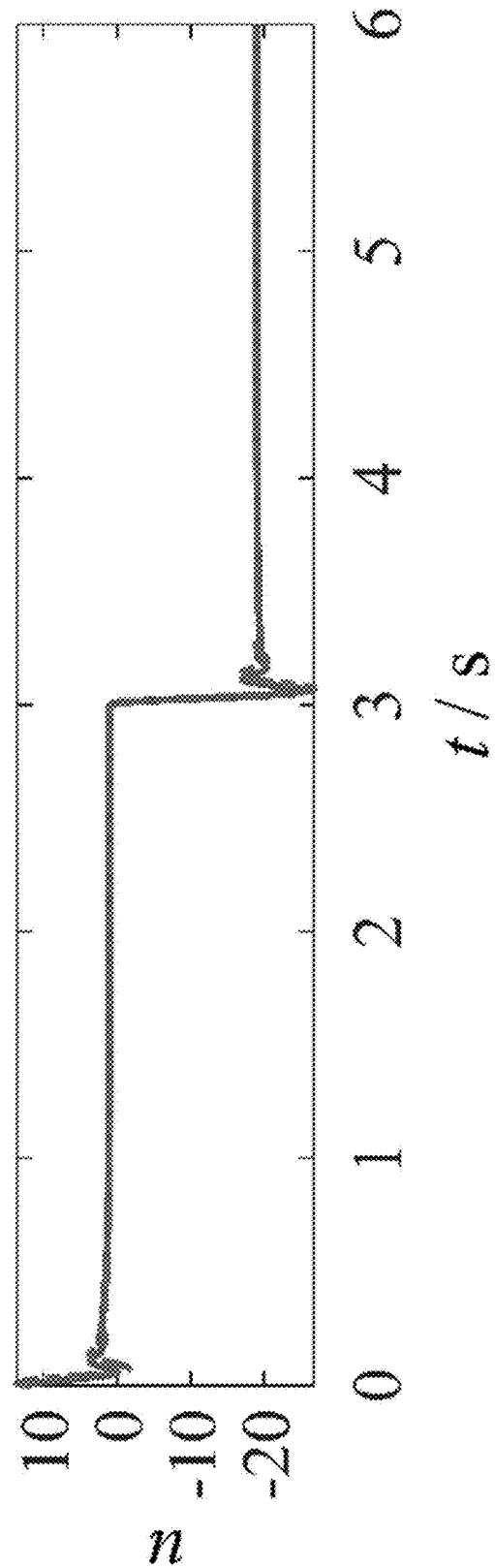

GENERALIZED ESTIMATOR (GE), AND GENERALIZED DISTURBANCE REJECTION CONTROLLER (GDRC) AND DESIGN METHOD THEREOF

CROSS REFERENCE TO RELATED APPLICATION

This patent application claims the benefit and priority of Chinese Patent Application No. 202211050253.0, filed with the China National Intellectual Property Administration on Aug. 31, 2022, the disclosure of which is incorporated by reference herein in its entirety as part of the present application.

TECHNICAL FIELD

The present disclosure relates to the field of estimators, and in particular to a generalized estimator (GE), and a generalized disturbance rejection controller (GDRC) and a design method thereof.

BACKGROUND

Rejection of various disturbances is of importance to design of electromechanical control systems. For example, control structures in 1) disturbance observer based control (DOBC), 2) Tomambe controller (TC), 3) active disturbance rejection control (ADRC), 4) desired dynamic equational proportional-integral-derivative (DDE-PID), and 5) cascade control (CC) reject the disturbances through different control strategies. These disturbance-rejection controllers are implemented based on different prerequisites and have different defects. 1) For the DOBC, there is a need to find an inverse for a nominal model of a controlled object, and when the nominal object is irreversible with a relative order of greater than or equal to 2, the design process is troublesome. 2) For the TC, derivative information of an order less than a relative order needs to be measurable. 3) For the ADRC, nominal models of all objects are considered as an integral tandem type, and model information is not fully used. 4) For the DDE-PID, the differential link is specially processed, and model information is not fully used. 5) For the CC, an intermediate variable of the controlled object needs to be measurable.

In actual engineering, estimators are typically designed based on priori knowledge on models, hardware conditions, and knowledge and structural selection of engineers. However, principles for designing the above estimators are varied a lot. It is too hard for engineers to know their performance well and design appropriate estimators. Therefore, it is urgently desirable to provide a practical estimator that is structurally uniform and functionally interchangeable. Even in different conditions, the estimator follows a same method in structure and design, and can be functionally adjusted according to different model information and estimation requirements.

SUMMARY

An objective of the present disclosure is to provide a GE, and a GDRC and a design method thereof, to supply a structurally uniform and functionally interchangeable GE, as well as a universal GDRC capable of designing different control strategies according to existing conditions of most systems.

To achieve the above objective, the present disclosure provides the following technical solutions:

A GE includes an inner-loop estimation controller and a nominal model module of a controlled object, where
the inner-loop estimation controller is connected to the nominal model module of the controlled object;
the inner-loop estimation controller is configured to transmit a control signal to the nominal model module according to an input variable and a virtual measurement output variable; and
the nominal model module is configured to input the control signal to a nominal model of the controlled object to obtain a controlled output vector and a virtual measurement output variable, and transmit the virtual measurement output variable to the inner-loop estimation controller.

Optionally, a transfer function of the GE includes: a transfer function from an input variable y to a controlled output vector $y_v$, and a transfer function from the input variable y to a virtual measurement output variable $y_c$;

the transfer function from the input variable y to the controlled output vector $y_v$ is $H_{y \mapsto y_v} = G_2(1+E_B G_2)^{-1} E_F$, where $H_{y \mapsto y_v}$ represents the transfer function from the input variable y to the controlled output vector $y_v$, $G_2$ represents a second general object transfer matrix, $E_B$ represents a first controller transfer matrix, and $E_F$ represents a second controller transfer matrix; and the transfer function from the input variable y to the virtual measurement output variable $y_c$ is $H_{y \mapsto y_c} = G_1 E_F - G_1 E_B G_2 (1\ EgG2)^{-1} E_F$, where $H_{y \mapsto y_c}$ represents the transfer function from the input variable y to the virtual measurement output variable $y_c$, and $G_1$ represents a first general object transfer matrix.

Optionally, when the nominal model of the controlled object is known and there is only one nominal model, a control signal $u_e$ is an estimated value for an inverse of the controlled object, and the GE is equivalent to a disturbance observer (DOB);

when the nominal model of the controlled object is known and there are two or more nominal models, a control signal $u_e$ is an estimated value for an inverse of the controlled object, an output variable of a nominal model other than a last-level nominal model is an estimated value for an intermediate variable of a system, and the GE is equivalent to a cascaded controller;

when the nominal model of the controlled object is of an integral tandem type, both an output variable of a nominal model other than a last-level nominal model and a control signal $u_e$ are an estimated value for derivative information of a system, and the GE is equivalent to an extended state observer (ESO) of an active disturbance rejection controller; and when derivative information output by the controlled object is directly measurable, an output variable of a nominal model other than a last-level nominal model is a measured value for derivative information of a system, and the GE is equivalent to a TC.

Optionally, there is one or more nominal models of the controlled object in the nominal model module; and
when there are a plurality of the nominal models of the controlled object, the plurality of the nominal models are connected in a cascaded form.

A GDRC includes an outer-loop controller and the above GE, where
the outer-loop controller includes an input terminal connected to an output terminal of the nominal model module in the GE, and an output terminal connected to an input terminal of the controlled object; and the outer-loop controller is configured to acquire a controlled variable according to a reference signal and the controlled output vector, and transmit the controlled variable to the controlled object;

an output terminal of the controlled object is connected to an input terminal of the GE; and the controlled object is configured to generate an output variable under control of the controlled variable and disturbance of a disturbance variable, and take the output variable as the input variable of the GE to input to the GE; and the GE is configured to obtain the controlled output vector according to the input variable, and transmit the controlled output vector to the outer-loop controller.

Optionally, the outer-loop controller includes: a controller C, a first difference calculation module, a second difference calculation module, and a generalized filter;

the controller C includes an input terminal connected to the output terminal of the nominal model module in the GE, and an output terminal connected to a first input terminal of the first difference calculation module; and the controller C is configured to input the reference signal, and output a tracking controlled component according to the reference signal and the virtual measurement output variable;

the first difference calculation module includes a second input terminal connected to an output terminal of the generalized filter, and an output terminal connected to a first input terminal of the second difference calculation module and the input terminal of the controlled object; and the first difference calculation module is configured to obtain the controlled variable by subtracting a disturbance estimate output by the generalized filter from the tracking controlled component, and transmit the controlled variable to the second difference calculation module and the controlled object; and the second difference calculation module includes a second input terminal connected to an output terminal of the inner-loop estimation controller in the GE, and an output terminal connected to an input terminal of the generalized filter; and the second difference calculation module is configured to subtract the controlled variable from the control signal and transmit the control signal to the generalized filter.

Optionally, the outer-loop controller has a following control equation:

$$u = (1 \quad -1)\begin{pmatrix} u_0 \\ \hat{d} \end{pmatrix}$$

$$= (C_F \quad |-C_B \quad -Q| \quad Q)\begin{pmatrix} r \\ y_v \\ u \end{pmatrix}$$

$$= (1-Q)^{-1}(C_F \quad |-C_B \quad -Q|)\begin{pmatrix} r \\ y_v \end{pmatrix}$$

where, u represents the controlled variable, $u_0$ represents the tracking controlled component, $\hat{d}$ represents the disturbance estimate, $C_F$ represents a feed-forward controller, $C_B$ represents a feedback controller, Q represents a quality factor of the generalized filter $$Q = \frac{K_Q}{s + K_Q},$$

$K_Q$ being a filter coefficient, and s being a differential operator, r represents the reference signal, and $y_v$ represents the virtual measurement output variable, $y_v := (y_{v1}, y_{v2}, y_{v3}, \ldots, y_{v(m-1)}, y_{vm})^T$, $y_{vi}$ being an output variable of an m−(i−1)th nominal model, i=1,2,3, ..., m−1, and symbol := being a defined symbol.

Optionally, a transfer function of the GDRC includes: a transfer function from the reference signal r to the input variable y, and a transfer function from the disturbance variable d to the input variable y;

the transfer function from the reference signal r to the input variable y is $H_{r \mapsto y} = G_p(1 G_p(1-Q)^{-1} C_{BQ} H_{y \mapsto y_c})^{-1} C_F$, where $H_{r \mapsto y}$ represents the transfer function from the reference signal r to the input variable y, $G_p$ represents an input-output relation of a real controlled object, $C_{BQ}$ represents a vector of each of the feedback controller and the generalized filter, $C_{BQ} := (C_B Q)$, and $H_{y \mapsto y_v}$ represents the transfer function from the input variable y to the controlled output vector $y_v$; and the transfer function from the disturbance variable d to the input variable y is $H_{d \mapsto y} g_p(1 + G_p(1-Q)^{-1} C_{BQ} H_{y \mapsto y_c})^{-1}$, where $H_{d \mapsto y}$ represents the transfer function from the disturbance variable d to the input variable y.

A design method of a GDRC includes:

determining a nominal model of a controlled object;

adjusting parameters of an inner-loop estimation controller in a GE according to the nominal model of the controlled object;

docking an input terminal of the well-adjusted GE with an output interface of the controlled object, and docking an output terminal of the well-adjusted GE with an input interface of an outer-loop controller, thereby completing structural configuration of the GDRC; and adjusting parameters of the outer-loop controller to obtain the well-adjusted GDRC.

Optionally, the determining a nominal model of a controlled object specifically includes:

obtaining a nominal model $$G_{n1} = \frac{s+1}{s^2 + 2.5s + 1}$$

when the controlled object is a minimum-phase electromechanical system $$G_{p1} = \frac{s+3}{s^2 + 5s + 4}$$

having a relative order of 1, where $G_{p1}$ represents an input-output relation of the minimum-phase electromechanical system, $G_{n1}$ represents a transfer function of a corresponding nominal model in the $G_{p1}$, and s represents a differential operator;

obtaining a nominal model $$G_{n2} = \frac{0.8(-0.1s+1)}{(3s+1)(1.5s+1)} e^{-0.5s}$$

when the controlled object is a non-minimum-phase electromechanical system $$G_{p2} = \frac{0.8(-0.1s+1)}{(3s+1)(1.5s+1)}e^{-0.5s}$$

having a relative order of 1, where $G_{p2}$ represents an input-output relation of the non-minimum-phase electromechanical system, and $G_{n2}$ represents a transfer function of a corresponding nominal model in the $G_{p2}$; obtaining a nominal model $$G_{n3} = \frac{1}{(1+s)(1+0.2s)}$$

when the controlled object is a minimum-phase electromechanical system $$G_{p3} = \frac{1}{(1+s)(1+0.2s)}$$

having a relative order of 2, where $G_{p3}$ represents an input-output relation of the minimum-phase electromechanical system having the relative order of 2, and $G_{n3}$ represents a transfer function of a corresponding nominal model in the $G_{p3}$; and
obtaining nominal models $$G'_{n1} = \frac{1}{1+s} \text{ and } G'_{n2} = \frac{1}{1+2s}e^{-0.1s}$$

when the controlled object is a minimum-phase cascaded electromechanical system $$G_p = \frac{1}{(1+s)(1+2s)}e^{-0.1s}$$

having a relative order of 2, where $G_p$ represents an input-output relation of the minimum-phase cascaded electromechanical system having the relative order of 2, $G'_{n1}$ represents a transfer function of a first-level nominal model in the cascaded electromechanical system, and $G'_{n2}$ represents a transfer function of a second-level nominal model in the cascaded electromechanical system.

According to the specific embodiments provided by the present disclosure, the present disclosure achieves the following technical effects:

According to the GE, and the GDRC and the design method thereof provided by the present disclosure, the GE includes an inner-loop estimation controller and a nominal model module of a controlled object. The inner-loop estimation controller transmits a control signal to the nominal model module. The nominal model module includes a nominal model of the controlled object. The GE is structurally uniform, and functionally interchangeable. With the structure of the GE, the typical disturbance rejection controller (DRC) is unified to a same control framework to obtain the GDRC that is more universal. The GDRC can design different control strategies according to existing conditions of most systems.

The GDRC in the present disclosure can easily extract an inverse variable, an intermediate variable and other estimation information of the controlled object according to requirements of a feedback system.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

FIGS. 4A-4B illustrate a comparison between control of a conventional DOB and control of a GE based DOB for a minimum-phase electromechanical system having a relative order of 1 in disturbance rejection performance according to an embodiment of the present disclosure, where FIG. 4A illustrates a comparison of an input variable y, and FIG. 4B illustrates a comparison of a controlled variable u;

FIG. 5A illustrates a comparison of an input variable y, and FIG. 5B illustrates a comparison of a controlled variable u;

FIGS. 6A-6B illustrate a comparison between conventional ADRC and GE based ADRC in tracking performance and disturbance rejection performance according to an embodiment of the present disclosure, where FIG. 6A illustrates a comparison of an input variable y, and FIG. 6B illustrates a comparison of a controlled variable u;

FIG. 7A illustrates a comparison of an input variable y, and FIG. 7B illustrates a comparison of a controlled variable u; FIG. 8A illustrates a comparison of an input variable y, and FIG. 8B illustrates a comparison of a controlled variable u.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a GE, and a GDRC and a design method thereof, to supply a structurally uniform and functionally interchangeable GE, as well as a universal GDRC capable of designing different control strategies according to existing conditions of most systems.

To make the above-mentioned objective, features, and advantages of the present disclosure clearer and more comprehensible, the present disclosure will be further described in detail below in conjunction with the accompanying drawings and specific embodiments.

Embodiment 1

Through theoretical and practical studies on various observers, the present disclosure gives deep insight into essences of the observers and internal relations between the observers, and provides a more universal and multifunctional estimator named as generalized estimator (GE). The estimator establishes a structural bridge, through which different observers are functionally interchangeable. Specifically, the GE is a closed-loop estimator jointly composed of a standard model and a controller. According to priori knowledge of researchers to model information, the standard model may be an accurate model, a weak model or even a model without information.

Figure 1:
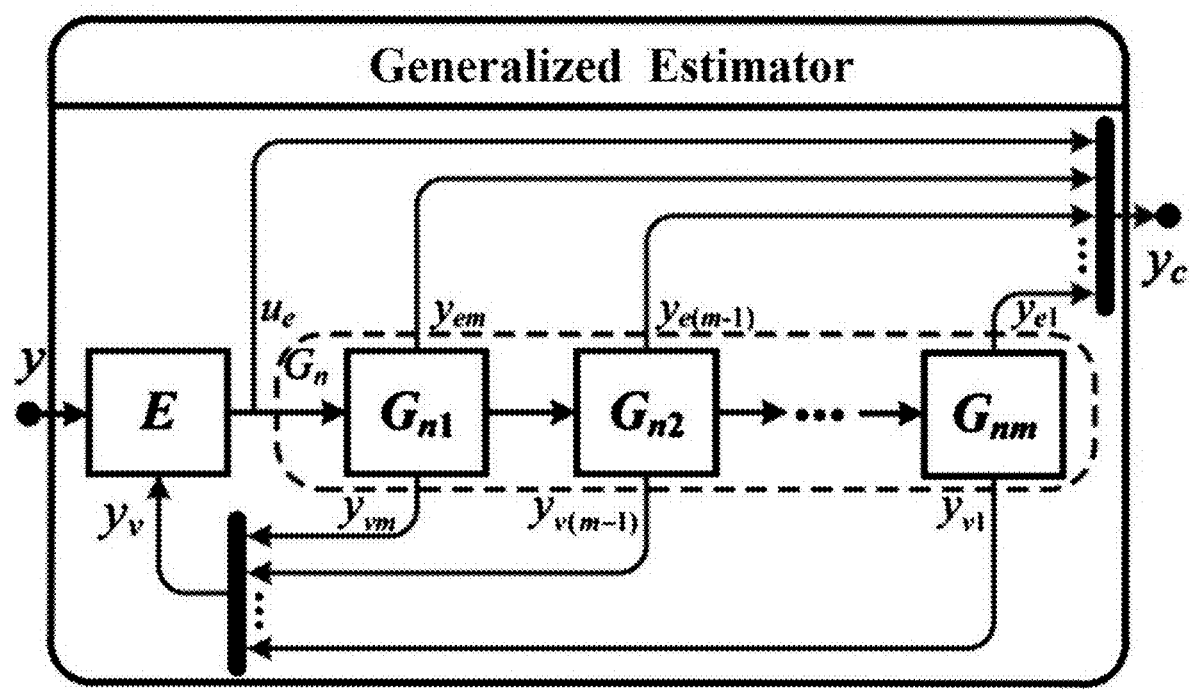
FIG. 1 is a structural view of a GE according to an embodiment of the present disclosure.

Referring to FIG. 1, the embodiment of the present disclosure provides a GE, including an inner-loop estimation controller and a nominal model module of a controlled object. The inner-loop estimation controller is connected to the nominal model module of the controlled object. The inner-loop estimation controller is configured to transmit a control signal to the nominal model module according to an input variable and a virtual measurement output variable. The nominal model module is configured to input the control signal to a nominal model of the controlled object to obtain a controlled output vector and a virtual measurement output variable, and transmit the virtual measurement output variable to the inner-loop estimation controller.

In FIG. 1, $y_c$ is the controlled output vector, and $y_v$ represents the virtual measurement output variable. An input-output relation of the GE may be expressed as:

$$\begin{pmatrix} \hat{y}_c \\ \hat{y}_v \end{pmatrix} =: G\hat{u}_e$$

$$= :\underbrace{\begin{pmatrix} G_1 \\ G_2 \end{pmatrix}}_{G} \underbrace{\overbrace{(E_F \; -E_B)}^{E}}_{u_e} \begin{pmatrix} \hat{y} \\ \hat{y}_v \end{pmatrix}$$

where, G and E respectively represent a general object transfer matrix and a controller transfer matrix, $G_1$ represents a first general object transfer matrix, $G_2$ represents a second general object transfer matrix, $\hat{y}_c$ represents an estimated value of the controlled output vector, $\hat{y}_v$ represents an estimate of the virtual measurement output variable, $u_e$ represents the control signal, $\hat{u}_e$ represents an estimated value of the control signal, $\hat{y}$ represents an estimated value of the input variable, $E_B$ represents a first controller transfer matrix, and $E_F$ represents a second controller transfer matrix. Generally $$y_c := (y_{e1}, y_{e2}, y_{e3}, \ldots, y_{e(m-1)}, y_{em}, u_e)^T$$

$$y_v := (y_{v1}, y_{v2}, y_{v3}, \ldots, y_{v(m-1)}, y_{vm})^T$$

where, $y_{ei}$ represents an output variable of an m−(i−1)th nominal model, i=1,2,3, . . . , m−1, m; and symbol :=is a defined symbol. Now, $$G_1 = T_1 \begin{pmatrix} G_{nm} \ldots G_{n2}G_{n1} \\ G_{n(m-1)} \ldots G_{n2}G_{n1} \\ \vdots \\ G_{n2}G_{n1} \\ G_{n1} \\ 1 \end{pmatrix}, \; G_2 = T_2 \begin{pmatrix} G_{nm} \ldots G_{n2}G_{n1} \\ G_{n(m-1)} \ldots G_{n2}G_{n1} \\ \vdots \\ G_{n2}G_{n1} \\ G_{n1} \end{pmatrix}$$

T where, both $T_1$ and $T_2$ are a transfer matrix, $T_1$ generally a unit matrix, and $G_{ni}$ represents an ith nominal model. $T_2$ is generally a following diagonal matrix $$T_2 = \begin{pmatrix} 1 & 0 & 0 & \ldots & 0 & 0 \\ 0 & sG_{nm} & 0 & \ldots & 0 & 0 \\ 0 & 0 & s^2 G_{nm} G_{n(m-1)} & \ldots & 0 & 0 \\ \vdots & \vdots & \vdots & \ddots & \vdots & \vdots \\ 0 & 0 & 0 & \ldots & s^{(m-2)} G_{nm} G_{n(m-1)} \ldots G_3 & 0 \\ 0 & 0 & 0 & \ldots & 0 & s^{(m-1)} G_{nm} G_{n(m-1)} \ldots G_2 \end{pmatrix}$$

$G_2$ is simplified as $$G_2 = \begin{pmatrix} 1 \\ s \\ s^2 \\ \vdots \\ s^{(m-2)} \\ s^{(m-1)} \end{pmatrix} \begin{pmatrix} G_{nm} \ldots G_{n2}G_{n1} \end{pmatrix}$$

Therefore, GE may be described as $$H_{y \mapsto y_v} = G_2(1 + E_B G_2)^{-1} E_F$$

$$H_{y \mapsto y_c} = G_1 E_F - G_1 E_B H_{y \mapsto y_v} =$$

$$G_1 \underbrace{(E_F \; -E_B)}_{E} \begin{pmatrix} 1 \\ H_{y \mapsto y_v} \end{pmatrix} = G_1 E_F - G_1 E_B G_2 (1 + E_B G_2)^{-1} E_F$$

where, $H_{y \mapsto y_v}$ and $H_{y \mapsto y_c}$ are transfer functions from y to $y_v$ and $y_c$, respectively.

Exemplarily, when the nominal model of the controlled object is known and there is only one nominal model, a control signal $u_e$ is an estimated value for an inverse of the controlled object, and the GE is equivalent to a DOB.

When the nominal model of the controlled object is known and there are two or more nominal models, a control signal $u_e$ is an estimated value for an inverse of the controlled object, an output variable of a nominal model other than a last-level nominal model is an estimated value for an intermediate variable of a system, and the GE is equivalent to a cascaded controller.

When the nominal model of the controlled object is of an integral tandem type, both an output variable of a nominal model other than a last-level nominal model and a control signal $u_e$ are an estimated value for derivative information of a system, and the GE is equivalent to an ESO of an active disturbance rejection controller.

When derivative information output by the controlled object is directly measurable, an output variable of a nominal model other than a last-level nominal model is a measured value for derivative information of a system, and the GE is equivalent to a TC.

There are one or more nominal models of the controlled object in the nominal model module. When there are a plurality of the nominal models of the controlled object, the plurality of the nominal models are connected in a cascaded form.

Embodiment 2

Figure 2:
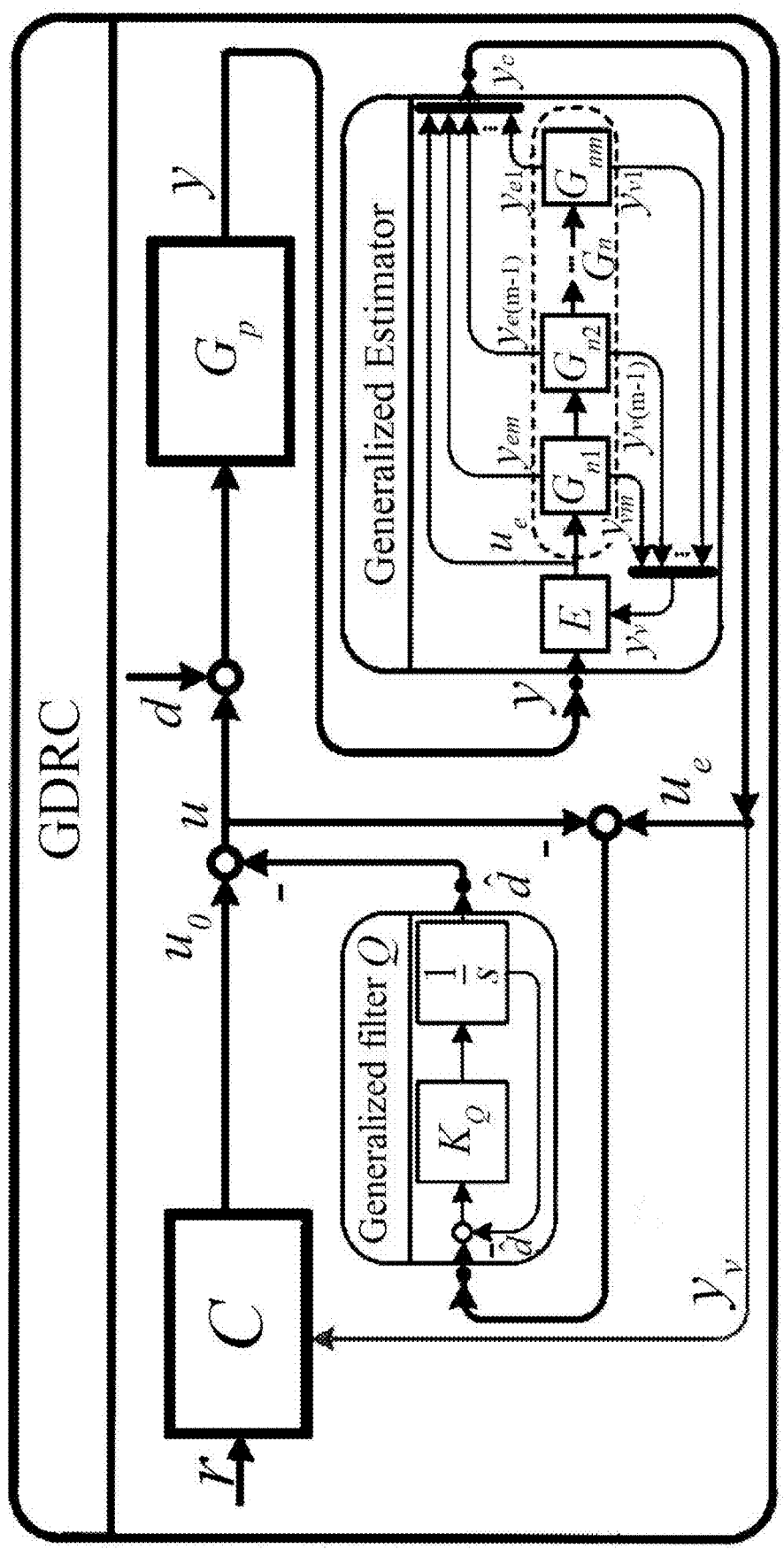
FIG. 2 is a structural view of a GDRC according to an embodiment of the present disclosure.

The embodiment of the present disclosure provides a GDRC. As shown in FIG. 2, the GDRC includes an outer-loop controller and the GE in Embodiment 1. The outer-loop controller includes an input terminal connected to an output terminal of the nominal model module in the GE, and an output terminal connected to an input terminal of the controlled object. The outer-loop controller is configured to acquire a controlled variable according to a reference signal and the controlled output vector, and transmit the controlled variable to the controlled object. An output terminal of the controlled object is connected to an input terminal of the GE. The controlled object is configured to generate an output variable under control of the controlled variable and disturbance of a disturbance variable, and take the output variable as the input variable of the GE to input to the GE. The GE is configured to obtain the controlled output vector according to the input variable, and transmit the controlled output vector to the outer-loop controller.

In an example, the outer-loop controller includes: a controller C, a first difference calculation module, a second difference calculation module, and a generalized filter. The controller C includes an input terminal connected to the output terminal of the nominal model module in the GE, and an output terminal connected to a first input terminal of the first difference calculation module. The controller C is configured to input the reference signal, and output a tracking controlled component according to the reference signal and the virtual measurement output variable. The first difference calculation module includes a second input terminal connected to an output terminal of the generalized filter, and an output terminal connected to a first input terminal of the second difference calculation module and the input terminal of the controlled object. The first difference calculation module is configured to obtain the controlled variable by subtracting a disturbance estimate output by the generalized filter from the tracking controlled component, and transmit the controlled variable to the second difference calculation module and the controlled object. The second difference calculation module includes a second input terminal connected to an output terminal of the inner-loop estimation controller in the GE, and an output terminal connected to an input terminal of the generalized filter. The second difference calculation module is configured to subtract the controlled variable from the control signal and transmit the control signal to the generalized filter.

The outer-loop controller has a following control equation:

$$u = \begin{pmatrix} 1 & -1 \end{pmatrix}\begin{pmatrix} u_0 \\ \hat{d} \end{pmatrix} = (C_F \ |C_B \ -Q| \ Q)\begin{pmatrix} r \\ y_v \\ u \end{pmatrix} = (1-Q)^{-1}(C_F \ |C_B \ -Q|)\begin{pmatrix} r \\ y_v \end{pmatrix}$$

where, u represents the controlled variable, $u_0$ represents the tracking controlled component, $\hat{d}$ represents the disturbance estimate, $C_F$ represents a feed-forward controller, $C_B$ represents a feedback controller, Q represents a quality factor of the generalized filter, r represents the reference signal, and $y_v$ represents the virtual measurement output variable, $y_v := (y_{v1}, y_{v2}, y_{v3}, \ldots, y_{v(m-1)}, y_{vm})^T$, being an output variable of an m−(i−1)th nominal model, i=1,2,3, ..., m−1, and symbol :=being a defined symbol.

Beside the two transfer functions of the GE, a transfer function of the GDRC further includes: a transfer function from the reference signal r to the input variable y, and a transfer function from the disturbance variable d to the input variable y.

The transfer function from the reference signal r to the input variable y is $H_{r \mapsto y} = G_p(1+G_p(1-Q)^{-1}C_{BQ}H_{y \mapsto y_v})^{-1}C_F$, where $H_{n \mapsto y}$ represents the transfer function from the reference signal r to the input variable y, $G_p$ represents an input-output relation of a real controlled object, $C_{BQ}$ represents a vector of each of the feedback controller and the generalized filter, $C_{BQ} := (C_B Q)$, and $H_{y \mapsto y_v}$ represents the transfer function from the input variable y to the controlled output vector $y_v$.

The transfer function from the disturbance variable d to the input variable y is $H_{r \mapsto y} = G_p(1-Q)^{-1}(1+G_p(1-Q)^{-1}C_{BQ}H_{y \mapsto y_v})^{-1}C_F$, where $H_{n \mapsto y}$ represents the transfer function from the reference signal r to the input variable y, $G_p$ represents the transfer function from the input variable y to the controlled output vector $y_v$.

The GDRC provides a uniform design architecture for a disturbance rejection control system. It includes control structures of the 1) DOBC, 2) TC, 3) ADRC, 4) DDE-PID, 5) CC, etc. The GDRC can easily extract an inverse variable, an intermediate variable and other estimation information of the controlled object according to requirements of a feedback system.

Embodiment 3

Figure 3:
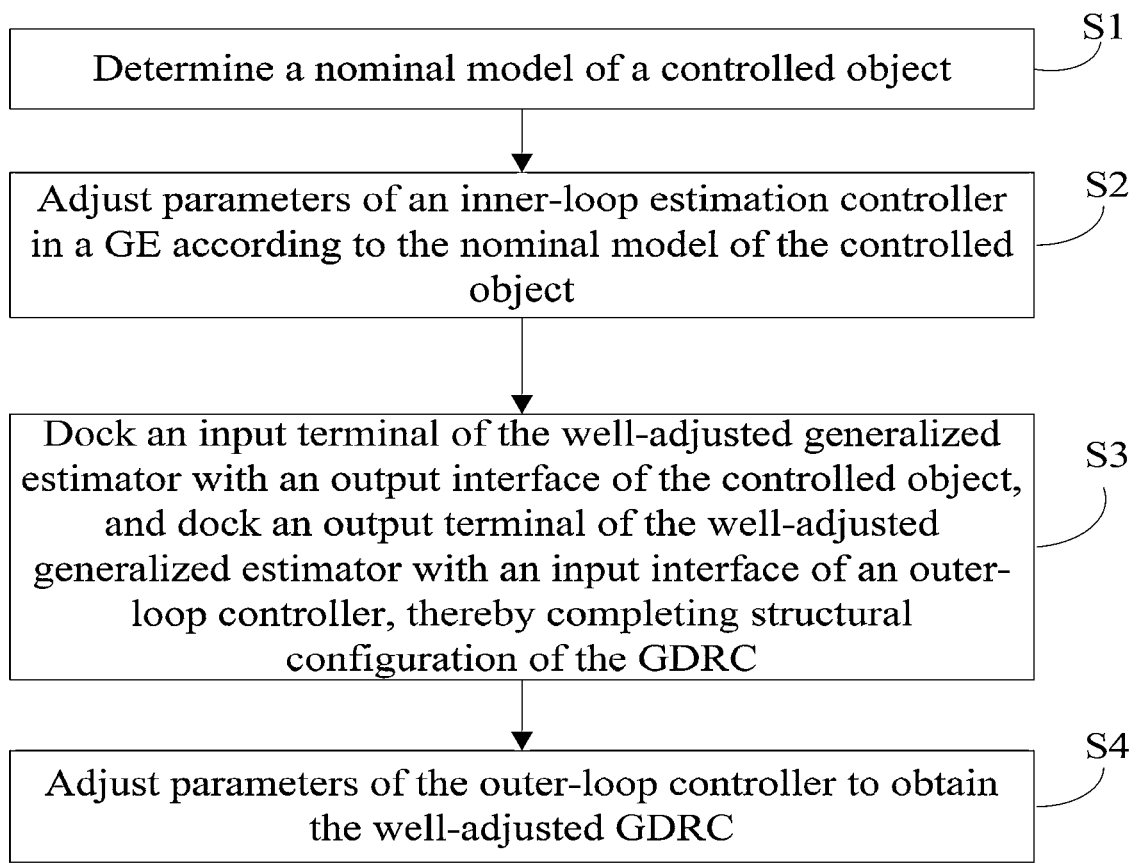
FIG. 3 is a flowchart of a design method of a GDRC according to an embodiment of the present disclosure.

For the GDRC in Embodiment 2, the embodiment of the present disclosure provides a design method of the GDRC. As shown in FIG. 3, the design method includes the following steps:

Step S1: Determine a nominal model of a controlled object.

The following describes how to determine the nominal model of the controlled object with examples.

A nominal model $$G_{n1} = \frac{s+1}{s^2 + 2.5s + 1}$$

is obtained when the controlled object is a minimum-phase electromechanical system $$G_{p1} = \frac{s+3}{s^2 + 5s + 4}$$

having a relative order of 1, where $G_{p1}$ represents an input-output relation of the minimum-phase electromechanical system, $G_{n1}$ represents a transfer function of a corresponding nominal model in the $G_{p1}$, and s represents a differential operator.

A nominal model $$G_{n2} = \frac{0.8(-0.1s + 1)}{(3s + 1)(1.5s + 1)} e^{-0.5s}$$

is obtained when the controlled object is a non-minimum-phase electromechanical system $$G_{p2} = \frac{0.8(-0.1s + 1)}{(3s + 1)(1.5s + 1)} e^{-0.5s}$$

having a relative order of 1, where $G_{p2}$ represents an input-output relation of the non-minimum-phase electromechanical system, and $G_{n2}$ represents a transfer function of a corresponding nominal model in the $G_{p2}$.

A nominal model $$G_{n3} = \frac{1}{(1+s)(1+0.2s)}$$

is obtained when the controlled object is a minimum-phase electromechanical system $$G_{p3} = \frac{1}{(1+s)(1+0.2s)}$$

having a relative order of 2, where $G_{p3}$ represents an input-output relation of the minimum-phase electromechanical system having the relative order of 2, and $G_{n3}$ represents a transfer function of a corresponding nominal model in the $G_{p3}$.

Nominal models $$G'_{n1} = \frac{1}{1+s} \text{ and } G'_{n2} = \frac{1}{1+2s} e^{-0.1s}$$

are obtained when the controlled object is a minimum-phase cascaded electromechanical system $$G_p = \frac{1}{(1+s)(1+2s)} e^{-0.1s}$$

having a relative order of 2, where $G_p$ represents an input-output relation of the minimum-phase cascaded electromechanical system having the relative order of 2, $G'_{n1}$ represents a transfer function of a first-level nominal model in the cascaded electromechanical system, and $G'_{n2}$ represents a transfer function of a second-level nominal model in the cascaded electromechanical system.

Step S2: Adjust parameters of an inner-loop estimation controller in a GE according to the nominal model of the controlled object.

The GE is a closed-loop system composed of an inner-loop estimation controller E and cascaded nominal models $G_{n1}, g_{n2}$ to $G_{nm}$ of a controlled object. FIG. 1 is a structural view of the GE. Parameters of the inner-loop estimation controller E are adjusted, such that an output $y_{e1}$ of the GE is approximate to an input y of the GE as fast as possible. In principle, the controller E may be any controller, and is preferably a DDE-PID controller.

$$E = \left( \underbrace{P + I\frac{1}{s} - b}_{E_F} - \underbrace{\left(P + I\frac{1}{s} D_1 D_2 \ldots D_{m-1}\right)}_{E_B} \right)$$

where, $P, I, D_i, b, i=1, 2, \ldots, i=m-1$ is a parameter to be adjusted, specifically $$\begin{cases} P = \frac{h_0 + kh_1}{l} \\ I = \frac{kh_0}{l} \\ D_i = \frac{h_i + kh_{i+1}}{l}, h_m \equiv 1, i = 1, 2, \ldots, m-1 \\ b = \frac{kh_1}{l} \end{cases}$$

A common relation is defined as follows $$h_i = C_m^i \omega_e^{m-i} \equiv \frac{m!}{i!(m-i)!} \omega_e^{m-i}, i = 1, 2, \ldots, m-1$$

where, $\omega_e$ is an expected bandwidth of the GE. Another common relation is defined as follows:

$$\gamma := \frac{\omega_e}{k} \in (0, 1]$$

Therefore, only three parameters $\omega_e, \gamma, l$ of the GE are adjusted. The three parameters are adjusted with a simple engineering method.

1) $\omega_e$ is set as a cut-off frequency of the controlled object.
2) yγ is selected according to requirements of the control system.
3) A large enough l is selected.
4) When control requirements are not satisfied, l is reduced until the system is critically stable.
5) If $\omega_e$ does not have l satisfying the control requirements, $\omega_e$ is increased, and Steps 3) and 4) are repeated.
6) Step 5) is repeated until the control requirements are met.

Therefore, the GE has the following properties:
1. When the nominal model of the controlled object is known and there is only one nominal model, $u_e$ is an estimated value for an inverse of the controlled object. The GE is equivalent to a DOB. The generalized estimator estimates the inverse of the nominal model simply, rather than finds the inverse directly.

2. When the nominal model of the controlled object is known and there are two or more nominal models, $u_e$ is an estimated value for an inverse of the controlled object, and $y_{e2}$ to $y_{e(m-1)}$, and $y_{em}$ are estimated values for intermediate variables of a system. The GE is equivalent to a cascaded controller. The generalized estimator estimates the intermediate variables simply, rather than directly measures the intermediate variables.

3. When the nominal model of the controlled object is of an integral tandem type, namely $G_{n1} = G_{n2} = \ldots = G_{nm} = 1/s$, the GE is equivalent to an ESO of an active disturbance rejection controller, and $y_{e2}$ to $y_{e(m-1)}$, $y_{em}$, and $u_e$ are estimated values for derivative information of a system.

4. When derivative information output by the controlled object is directly measurable, the GE is equivalent to a TC, and $y_{e2}$ to $y_{e(m-1)}$, and $y_{em}$ are measured value for derivative information of a system.

Through the above analysis, it can be seen that the generalized estimator provides a uniform design framework for different control methods (including DOBC, CC, ADRC, and TC), with a simple adjustment method and a specific physical meaning. According to the framework, the generalized estimator can implement equivalent control strategies.

Step S3: Dock an input terminal of the well-adjusted generalized estimator with an output interface of the controlled object, and dock an output terminal of the well-adjusted generalized estimator with an input interface of an outer-loop controller, thereby completing structural configuration of the GDRC.

Interface docking: The structure of the GDRC is configured. The input variable y of the well-adjusted GE is docked with the output interface of the controlled system, and outputs $u_e$ and $y_{e1}$ to $y_{e(m-1)}$ and $y_{em}$ of the GE are docked with corresponding interfaces of the controller, thereby completing structural configuration of the GDRC, as shown in FIG. 2.

Step S4: Adjust parameters of the outer-loop controller to obtain the well-adjusted GDRC.

Parameters of the GDRC are adjusted. Structures of the controller C and the generalized filter Q in FIG. 2 are designed according to robust performance, disturbance rejection performance and tracking performance of the system, and their parameters are adjusted. A reference signal r and a feedback signal $y_v$ serve as an input of the C.

$$u = (1 \quad -1)\begin{pmatrix} u_0 \\ \hat{d} \end{pmatrix} =$$

$$(C_F \mid -C_B \quad -Q \mid Q)\begin{pmatrix} r \\ y_v \\ u \end{pmatrix} = (1-Q)^{-1}(C_F \mid -C_B \quad -Q)\begin{pmatrix} r \\ y_v \end{pmatrix}$$

$H_{r \mapsto y}$, $H_{d \mapsto y}$ are respectively transfer functions from r and d to y, and are respectively expressed as:

$H_{r \mapsto y} = g_p(1-Q)^{-1}(1+G_p(1-Q)^{-1}C_{BQ}H_{y \mapsto y_c})^{-1}C_F$ $H_{d \mapsto y} = G_p(1+G_p(1-Q)^{-1}C_{BQ}H_{y \mapsto y_c})^{-1}$ where, $C := (C_F - C_B)$ $C_{BQ} := (C_B Q)$ In principle, the controller C may be any controller, the DDE-PID controller is also acceptable, and The controller is adjusted in a same way as E, which is not repeated herein.

$$Q = \frac{K_Q}{s + K_Q}$$

where, $K_Q$ is a filter coefficient.

The present disclosure designs the controller of the GE based on desired dynamic parameterization. The controller is configured based on closed-loop characteristics of DDE PID to GE, and the closed loop is dynamically applied to a more standard desired PID. The characteristics of the GE on the desired dynamic PID are analyzed conveniently, and the method based on the desired dynamic parameterization is adjusted conveniently with the specific physical significance.

The GE on the inner loop of the GDRC is designed through the desired dynamic PID. Hence, estimation performance of the GE can be evaluated intuitively according to differences with the desired dynamic PID. The rate of convergence of the GE on the inner loop of the GDRC can be adjusted intuitively through the desired dynamic PID.

The specific implementation and working process of the present disclosure are further described below in more detail with reference to FIGS. 4A-4B to FIGS. 8A-8B.

For a minimum-phase electromechanical system $$G_{p1} = \frac{s+3}{s^2 + 5s + 4}$$

having a relative order of 1, a nominal model obtained is $$G_{n1} = \frac{s+1}{s^2 + 2.5s + 1}.$$

The inner-loop estimation controller E is designed with the nominal model, such that dynamic characteristics are as fast as possible. The controller C and the generalized filter Q are designed as required by the robust performance, disturbance rejection performance, and tracking performance of the system. FIGS. 4A-4B illustrate a comparison between control of a conventional DOB and control of a GE based DOB in disturbance rejection performance.

Figure 5A:
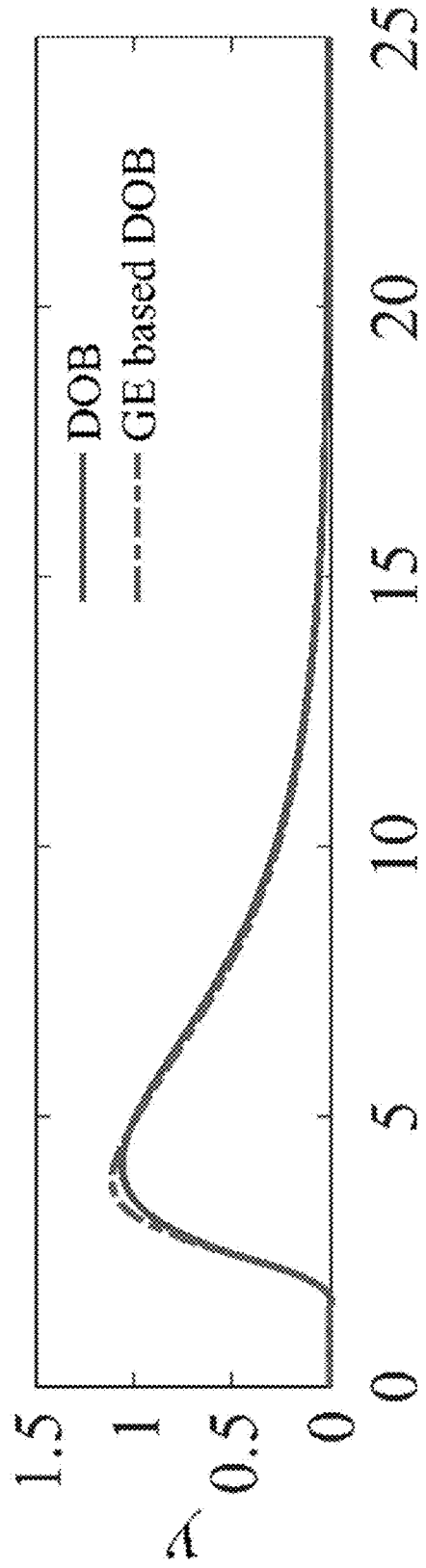
FIGS. 5A-5B illustrate a comparison between control of a conventional DOB and control of a GE based DOB for a non-minimum-phase electromechanical system having a relative order of 1 in disturbance rejection performance according to an embodiment of the present disclosure, where
Figure 5B:
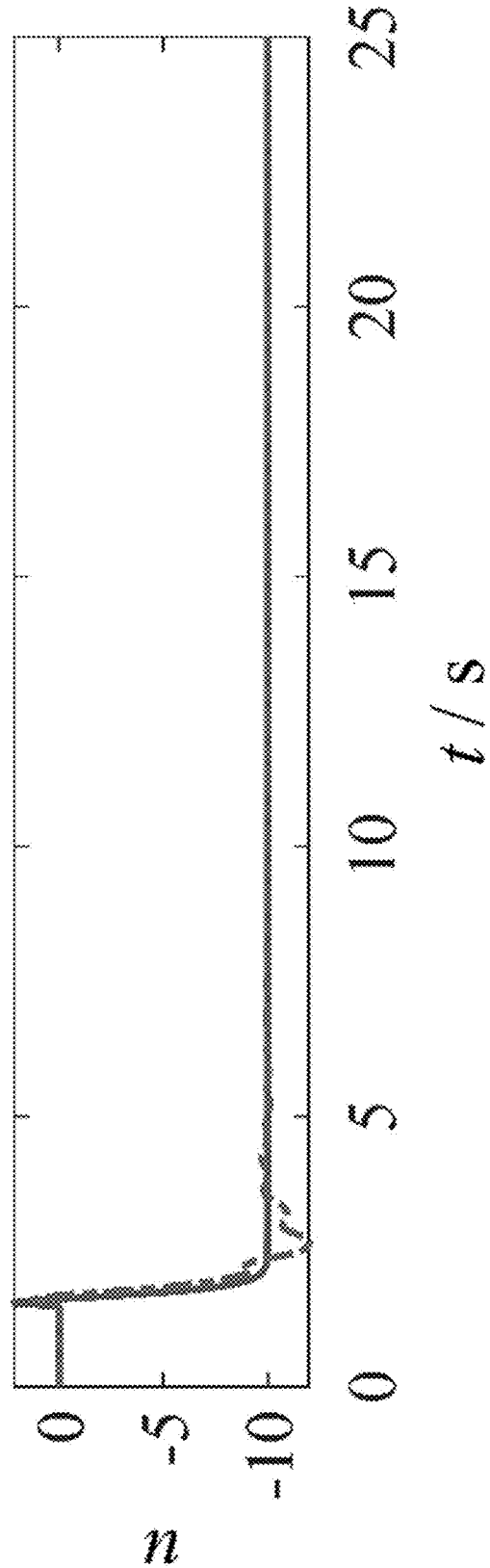

For a non-minimum-phase electromechanical system $$G_{p2} = G_{n2} = \frac{0.8(-0.1s+1)}{(3s+1)(1.5s+1)} e^{-0.5s}$$

having a relative order of 1, the inner-loop estimation controller E is designed with the nominal model, such that dynamic characteristics are as fast as possible. The controller C and the generalized filter Q are designed as required by the robust performance, disturbance rejection performance, and tracking performance of the system. FIGS. 5A-5B illustrate a comparison between control of a conventional DOB and control of a GE based DOB in disturbance rejection performance.

For a minimum-phase electromechanical system $$G_{p3} = G_{n3} = \frac{1}{(1+s)(1+0.2s)}$$

having a relative order of 2, the inner-loop estimation controller E is designed with the nominal model, such that dynamic characteristics are as fast as possible. The controller C and the generalized filter Q are designed as required by the robust performance, disturbance rejection performance, and tracking performance of the system. FIGS. 6A-6B illustrate a comparison between conventional ADRC and GE based ADRC in tracking performance and disturbance rejection performance.

Figure 7A:
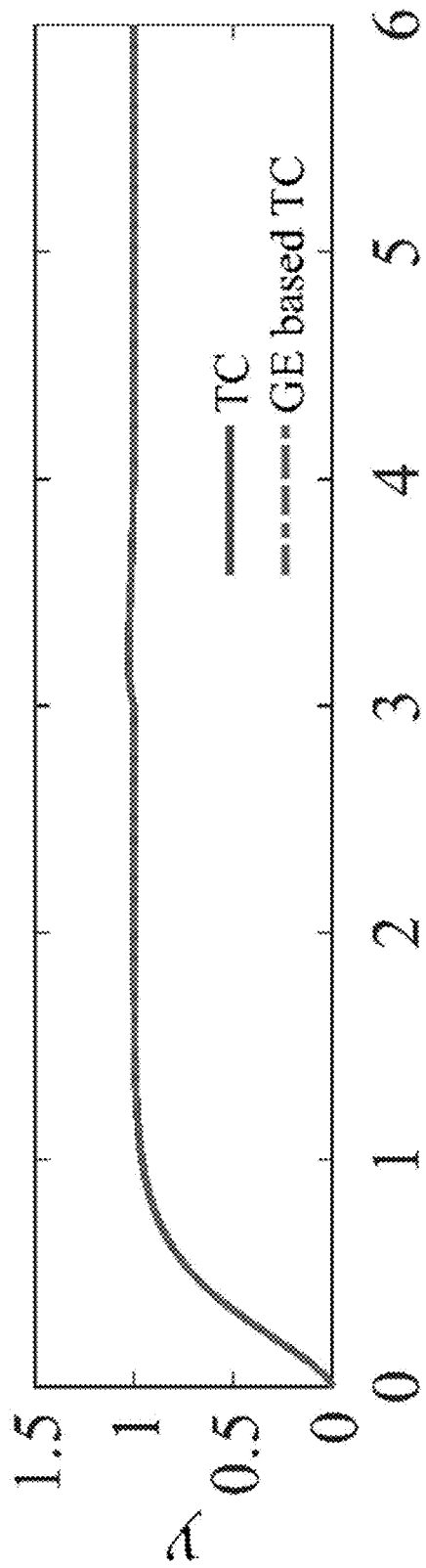
FIGS. 7A-7B illustrate a comparison between a conventional TC and a GE based TC in tracking performance and disturbance rejection performance according to an embodiment of the present disclosure, where
Figure 7B:
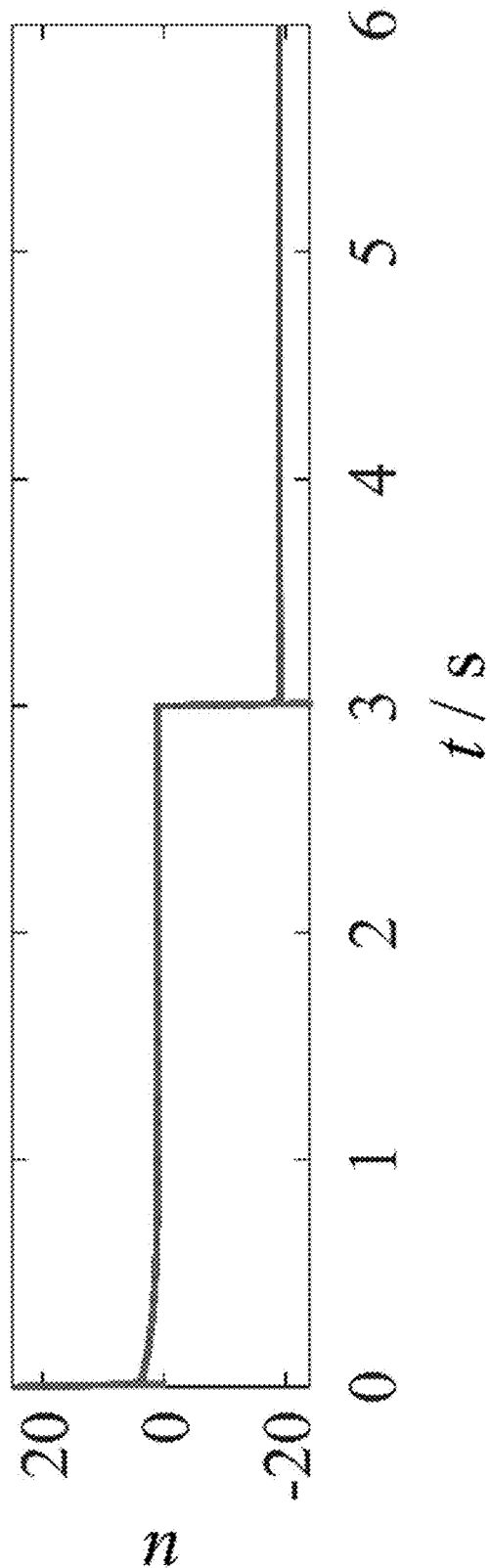

For a minimum-phase electromechanical system $$G_{p3} = \frac{1}{(1+s)(1+0.2s)}$$

having a relative order of 2, the inner-loop estimation controller E is designed with the nominal model, such that dynamic characteristics are as fast as possible. The controller C and the generalized filter Q are designed as required by the robust performance, disturbance rejection performance, and tracking performance of the system. FIGS. 7A-7B illustrate a comparison between a conventional TC and a GE based TC in tracking performance and disturbance rejection performance.

For a minimum-phase electromechanical system $$G_p = \frac{1}{(1+s)(1+2s)} e^{-0.1s}$$

having a relative order of 2, a nominal model obtained is $$G_{n1} = \frac{1}{1+s}, \quad G_{n2} = \frac{1}{1+2s} e^{-0.1s}.$$

Figure 8A:
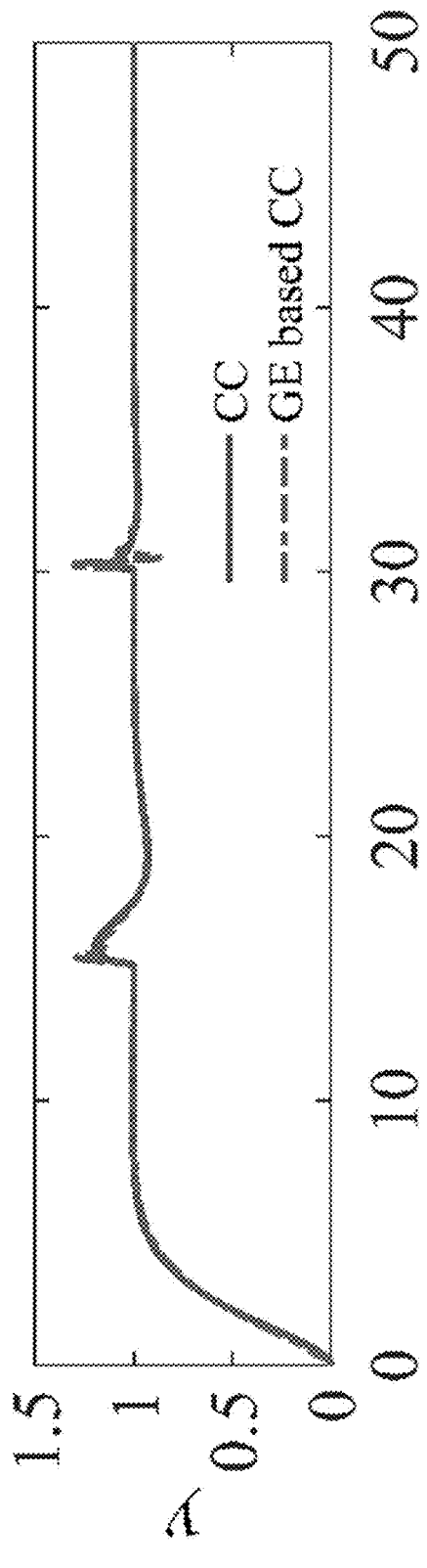
FIGS. 8A-8B illustrate a comparison between conventional CC and GE based CC in tracking performance and disturbance rejection performance according to an embodiment of the present disclosure, where
Figure 8B:
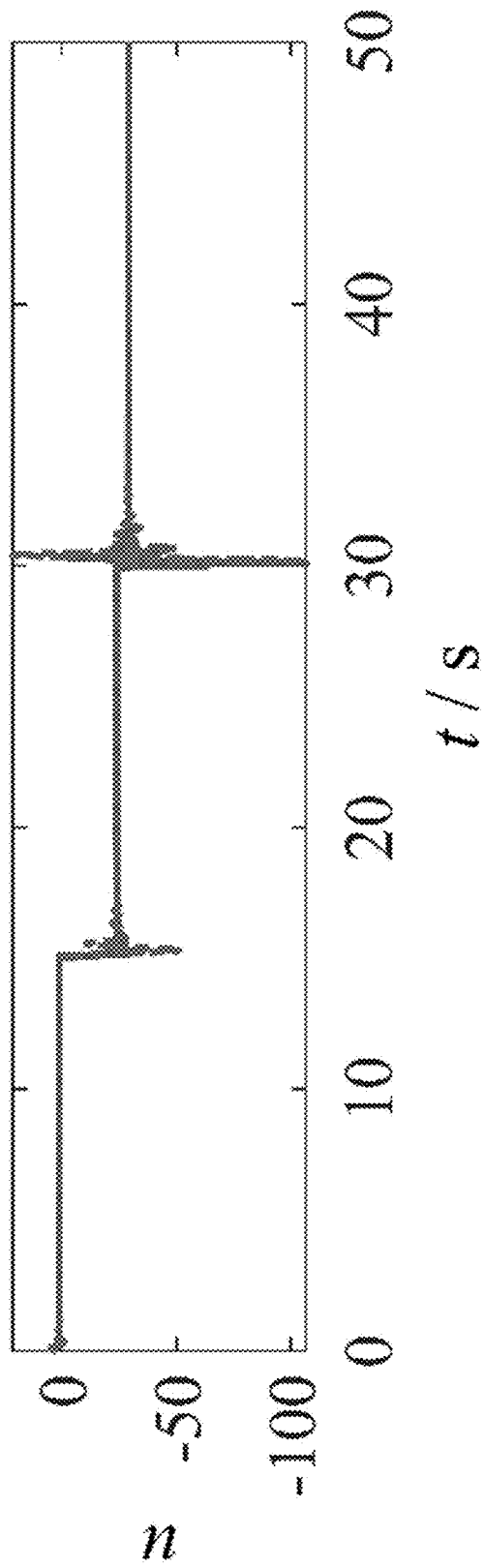

The inner-loop estimation controller E is designed with the nominal model, such that dynamic characteristics are as fast as possible. The controller C and the generalized filter Q are designed as required by the robust performance, disturbance rejection performance, and tracking performance of the system. FIGS. 8A-8B illustrate a comparison between conventional CC and GE based CC in tracking performance and disturbance rejection performance.

Each embodiment of the present specification is described in a progressive manner, each embodiment focuses on the difference from other embodiments, and the same and similar parts between the embodiments may refer to each other.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A generalized estimator (GE), comprising an inner-loop estimation controller and a nominal model module of a controlled object, wherein:
   the inner-loop estimation controller is connected to the nominal model module of the controlled object;
   the inner-loop estimation controller is configured to transmit a control signal to the nominal model module according to an input variable and a virtual measurement output variable; and
   the nominal model module is configured to input the control signal to a nominal model of the controlled object to obtain a controlled output vector and a virtual measurement output variable, and transmit the virtual measurement output variable to the inner-loop estimation controller,
   wherein a transfer function of the GE comprises: a transfer function from an input variable y to a controlled output vector $y_v$, and a transfer function from the input variable y to a virtual measurement output variable $y_c$,
   the transfer function from the input variable y to the controlled output vector $y_v$ is $H_{y \mapsto y_v} = G_2(1+E_B G_2)^{-1} E_F$, wherein $H_{y \mapsto y_v}$ represents the transfer function from the input variable y to the controlled output vector $y_v$, $G_2$ represents a second general object transfer matrix, $E_B$ represents a first controller transfer matrix, and $E_F$ represents a second controller transfer matrix, and
   the transfer function from the input variable y to the virtual measurement output variable $y_c$ is $H_{y \mapsto y_c} = G_1 E_F - G_2 E_B G_2 (1+E_B G_2)^{-1} E_F$, wherein $H_{y \mapsto y_c}$ represents the transfer function from the input variable y to the virtual measurement output variable $y_c$, and $G_1$ represents a first general object transfer matrix.

2. The GE according to claim 1, wherein when the nominal model of the controlled object is known and there is only one nominal model, a control signal $u_e$ is an estimated value for an inverse of the controlled object, and the GE is equivalent to a disturbance observer (DOB);
   when the nominal model of the controlled object is known and there are two or more nominal models, a control signal $u_e$ is an estimated value for an inverse of the controlled object, an output variable of a nominal model other than a last-level nominal model is an estimated value for an intermediate variable of a system, and the GE is equivalent to a cascaded controller;
   when the nominal model of the controlled object is of an integral tandem type, both an output variable of a nominal model other than a last-level nominal model and a control signal $u_e$ are an estimated value for derivative information of a system, and the GE is equivalent to an extended state observer (ESO) of an active disturbance rejection controller; and
   when derivative information output by the controlled object is directly measurable, an output variable of a nominal model other than a last-level nominal model is a measured value for derivative information of a system, and the GE is equivalent to a Tornambe controller (TC).

3. The GE according to claim 1, wherein there is one or more nominal models of the controlled object in the nominal model module; and
   when there are a plurality of the nominal models of the controlled object, the plurality of the nominal models are connected in a cascaded form.

4. A generalized disturbance rejection controller (GDRC), comprising an outer-loop controller and the generalized estimator (GE) according to claim 1, wherein:
the outer-loop controller comprises an input terminal connected to an output terminal of the nominal model module in the GE, and an output terminal connected to an input terminal of the controlled object; and the outer-loop controller is configured to acquire a controlled variable according to a reference signal and the controlled output vector, and transmit the controlled variable to the controlled object;
an output terminal of the controlled object is connected to an input terminal of the GE; and the controlled object is configured to generate an output variable under control of the controlled variable and disturbance of a disturbance variable, and take the output variable as the input variable of the GE to input to the GE; and
the GE is configured to obtain the controlled output vector according to the input variable, and transmit the controlled output vector to the outer-loop controller.

5. The GDRC according to claim 4, wherein a transfer function of the GE comprises: a transfer function from an input variable y to a controlled output vector $y_v$, and a transfer function from the input variable y to a virtual measurement output variable $y_c$;
the transfer function from the input variable y to the controlled output vector $y_v$ is $H_{y \mapsto y_v} = G_2(1+E_B G_2)^{-1} E_F$, wherein $H_{y \mapsto y_v}$ represents the transfer function from the input variable y to the controlled output vector $y_v$, $G_2$ represents a second general object transfer matrix, $E_B$ represents a first controller transfer matrix, and $E_F$ represents a second controller transfer matrix; and
the transfer function from the input variable y to the virtual measurement output variable $y_c$ is $H_{y \mapsto y_c} = G_1 E_F - G_1 E_B G_2 (1+E_B G_2)^{-1} E_F$, wherein $H_{y \mapsto y_c}$ represents the transfer function from the input variable y to the virtual measurement output variable $y_c$, and $G_1$ represents a first general object transfer matrix.

6. The GDRC according to claim 4, wherein when the nominal model of the controlled object is known and there is only one nominal model, a control signal $u_e$ is an estimated value for an inverse of the controlled object, and the GE is equivalent to a disturbance observer (DOB);
when the nominal model of the controlled object is known and there are two or more nominal models, a control signal $u_e$ is an estimated value for an inverse of the controlled object, an output variable of a nominal model other than a last-level nominal model is an estimated value for an intermediate variable of a system, and the GE is equivalent to a cascaded controller;
when the nominal model of the controlled object is of an integral tandem type, both an output variable of a nominal model other than a last-level nominal model and a control signal $u_e$ are an estimated value for derivative information of a system, and the GE is equivalent to an extended state observer (ESO) of an active disturbance rejection controller; and
when derivative information output by the controlled object is directly measurable, an output variable of a nominal model other than a last-level nominal model is a measured value for derivative information of a system, and the GE is equivalent to a Tornambe controller (TC).

7. The GDRC according to claim 4, wherein there is one or more nominal models of the controlled object in the nominal model module; and when there are a plurality of the nominal models of the controlled object, the plurality of the nominal models are connected in a cascaded form.

8. The GDRC according to claim 4, wherein the outer-loop controller comprises: a controller C, a first difference calculation module, a second difference calculation module, and a generalized filter;
the controller C comprises an input terminal connected to the output terminal of the nominal model module in the GE, and an output terminal connected to a first input terminal of the first difference calculation module; and the controller C is configured to input the reference signal, and output a tracking controlled component according to the reference signal and the virtual measurement output variable;
the first difference calculation module comprises a second input terminal connected to an output terminal of the generalized filter, and an output terminal connected to a first input terminal of the second difference calculation module and the input terminal of the controlled object; and the first difference calculation module is configured to obtain the controlled variable by subtracting a disturbance estimate output by the generalized filter from the tracking controlled component, and transmit the controlled variable to the second difference calculation module and the controlled object; and
the second difference calculation module comprises a second input terminal connected to an output terminal of the inner-loop estimation controller in the GE, and an output terminal connected to an input terminal of the generalized filter; and the second difference calculation module is configured to subtract the controlled variable from the control signal and transmit the control signal to the generalized filter.

9. The GDRC according to claim 5, wherein the outer-loop controller comprises: a controller C, a first difference calculation module, a second difference calculation module, and a generalized filter;
the controller C comprises an input terminal connected to the output terminal of the nominal model module in the GE, and an output terminal connected to a first input terminal of the first difference calculation module; and the controller C is configured to input the reference signal, and output a tracking controlled component according to the reference signal and the virtual measurement output variable;
the first difference calculation module comprises a second input terminal connected to an output terminal of the generalized filter, and an output terminal connected to a first input terminal of the second difference calculation module and the input terminal of the controlled object; and the first difference calculation module is configured to obtain the controlled variable by subtracting a disturbance estimate output by the generalized filter from the tracking controlled component, and transmit the controlled variable to the second difference calculation module and the controlled object; and
the second difference calculation module comprises a second input terminal connected to an output terminal of the inner-loop estimation controller in the GE, and an output terminal connected to an input terminal of the generalized filter; and the second difference calculation module is configured to subtract the controlled variable from the control signal and transmit the control signal to the generalized filter.

10. The GDRC according to claim 6, wherein the outer-loop controller comprises: a controller C, a first difference calculation module, a second difference calculation module, and a generalized filter;

the controller C comprises an input terminal connected to the output terminal of the nominal model module in the GE, and an output terminal connected to a first input terminal of the first difference calculation module; and the controller C is configured to input the reference signal, and output a tracking controlled component according to the reference signal and the virtual measurement output variable;

the first difference calculation module comprises a second input terminal connected to an output terminal of the generalized filter, and an output terminal connected to a first input terminal of the second difference calculation module and the input terminal of the controlled object; and the first difference calculation module is configured to obtain the controlled variable by subtracting a disturbance estimate output by the generalized filter from the tracking controlled component, and transmit the controlled variable to the second difference calculation module and the controlled object; and the second difference calculation module comprises a second input terminal connected to an output terminal of the inner-loop estimation controller in the GE, and an output terminal connected to an input terminal of the generalized filter; and the second difference calculation module is configured to subtract the controlled variable from the control signal and transmit the control signal to the generalized filter.

11. The GDRC according to claim 7, wherein the outer-loop controller comprises: a controller C, a first difference calculation module, a second difference calculation module, and a generalized filter;

the controller C comprises an input terminal connected to the output terminal of the nominal model module in the GE, and an output terminal connected to a first input terminal of the first difference calculation module; and the controller C is configured to input the reference signal, and output a tracking controlled component according to the reference signal and the virtual measurement output variable;

the first difference calculation module comprises a second input terminal connected to an output terminal of the generalized filter, and an output terminal connected to a first input terminal of the second difference calculation module and the input terminal of the controlled object; and the first difference calculation module is configured to obtain the controlled variable by subtracting a disturbance estimate output by the generalized filter from the tracking controlled component, and transmit the controlled variable to the second difference calculation module and the controlled object; and the second difference calculation module comprises a second input terminal connected to an output terminal of the inner-loop estimation controller in the GE, and an output terminal connected to an input terminal of the generalized filter; and the second difference calculation module is configured to subtract the controlled variable from the control signal and transmit the control signal to the generalized filter.

12. The GDRC according to claim 8, wherein the outer-loop controller has a following control equation:

$$u = (1 \ -1)\begin{pmatrix} u_0 \\ \hat{d} \end{pmatrix} =$$
$$(C_F \ |-C_B \ -Q| \ Q)\begin{pmatrix} r \\ y_v \\ u \end{pmatrix} = (1-Q)^{-1}(C_F \ |-C_B \ -Q)\begin{pmatrix} r \\ y_v \end{pmatrix}$$

wherein, u represents the controlled variable, $u_0$ represents the tracking controlled component, $\hat{d}$ represents the disturbance estimate, $C_F$ represents a feed-forward controller, $C_B$ represents a feedback controller, Q represents a quality factor of the generalized filter, $$Q = \frac{K_Q}{s + K_Q},$$

$K_Q$ being a filter coefficient, and s being a differential operator, r represents the reference signal, and $y_v$ represents the virtual measurement output variable, $y_v := (y_{v1}, y_{v2}, y_{v3}, \ldots, y_{v(m-1)}, y_{vm})^T$, $y_{vi}$ being an output variable of an m−(i−1)th nominal model, i=1,2,3, ..., m−1, and symbol := being a defined symbol.

13. The GDRC according to claim 9, wherein the outer-loop controller has a following control equation:

$$u = (1 \ -1)\begin{pmatrix} u_0 \\ \hat{d} \end{pmatrix} =$$
$$(C_F \ |-C_B \ -Q| \ Q)\begin{pmatrix} r \\ y_v \\ u \end{pmatrix} = (1-Q)^{-1}(C_F \ |-C_B \ -Q)\begin{pmatrix} r \\ y_v \end{pmatrix}$$

wherein, u represents the controlled variable, $u_0$ represents the tracking controlled component, $\hat{d}$ represents the disturbance estimate, $C_F$ represents a feed-forward controller, $C_B$ represents a feedback controller, Q represents a quality factor of the generalized filter, $$Q = \frac{K_Q}{s + K_Q},$$

$K_Q$ being a filter coefficient, and s being a differential operator, r represents the reference signal, and $y_v$ represents the virtual measurement output variable, $y_v = (y_{v1}, y_{v2}, y_{v3}, \ldots, y_{v(m-1)}, y_{vm})^T$, $y_{vi}$ being an output variable of an m−(i−1)th nominal model, i=1,2,3, ..., m−1, and symbol := being a defined symbol.

14. The GDRC according to claim 10, wherein the outer-loop controller has a following control equation:

$$u = (1 \ -1)\begin{pmatrix} u_0 \\ \hat{d} \end{pmatrix} =$$
$$(C_F \ |-C_B \ -Q| \ Q)\begin{pmatrix} r \\ y_v \\ u \end{pmatrix} = (1-Q)^{-1}(C_F \ |-C_B \ -Q)\begin{pmatrix} r \\ y_v \end{pmatrix}$$

wherein, u represents the controlled variable, $u_0$ represents the tracking controlled component, $\hat{d}$ represents the disturbance estimate, $C_F$ represents a feed-forward controller, $C_B$ represents a feedback controller, Q represents a quality factor of the generalized filter, $$Q = \frac{K_Q}{s + K_Q},$$

$K_Q$ being a filter coefficient, and s being a differential operator, r represents the reference signal, and $y_v$ represents the virtual measurement output variable, $y_v := (y_{v1}, y_{v2}, y_{v3}, \ldots, y_{v(m-1)}, y_{vm})^T$, $y_{vi}$ being an output variable of an m−(i−1)th nominal model, i=1,2,3, ..., m−1, and symbol :=being a defined symbol.

15. The GDRC according to claim 11, wherein the outer-loop controller has a following control equation:

$$u = (1\ -1)\begin{pmatrix}u_0 \\ \hat{d}\end{pmatrix} =$$

$$(C_F\ |-C_B\ -Q|\ Q)\begin{pmatrix}r \\ y_v \\ u\end{pmatrix} = (1-Q)^{-1}(C_F\ |-C_B\ -Q)\begin{pmatrix}r \\ y_v\end{pmatrix}$$

wherein, u represents the controlled variable, $u_0$ represents the tracking controlled component, $\hat{d}$ represents the disturbance estimate, $C_F$ represents a feed-forward controller, $C_B$ represents a feedback controller, Q represents a quality factor of the generalized filter, $$Q = \frac{K_Q}{s + K_Q},$$

$K_Q$ being a filter coefficient, and s being a differential operator, r represents the reference signal, and $y_v$ represents the virtual measurement output variable, $y_v := (y_{v1}, y_{v2}, y_{v3}, \ldots, y_{v(m-1)}, y_{vm})^T$, $y_{vi}$ being an output variable of an m−(i−1)th nominal model, i=1,2,3, ..., m−1, and symbol :=being a defined symbol.

16. The GDRC according to claim 12, wherein a transfer function of the GDRC comprises: a transfer function from the reference signal r to the input variable y, and a transfer function from the disturbance variable d to the input variable y;

the transfer function from the reference signal r to the input variable y is $H_{r \mapsto y} = G_p(1-Q)^{-1}(1+G_p(1-Q)^{-1}C_{BQ}H_{y \mapsto y_e})^{-1}C_F$, wherein $H_{r \mapsto y}$ represents the transfer function from the reference signal r to the input variable y, $G_p$ represents an input-output relation of a real controlled object, $C_{BQ}$ represents a vector of each of the feedback controller and the generalized filter, $C_{BQ} := (C_B\ Q)$, and $H_{y \mapsto y_e}$ represents the transfer function from the input variable y to the controlled output vector $y_v$; and the transfer function from the disturbance variable d to the input variable y is $H_{d \mapsto y} = G_p(1+G_p\ (1-Q)^{-1} C_{BQ}H_{y \mapsto y_e})^{-1}$, wherein $H_{d \mapsto y}$ represents the transfer function from the disturbance variable d to the input variable y.

17. The GDRC according to claim 13, wherein a transfer function of the GDRC comprises: a transfer function from the reference signal r to the input variable y, and a transfer function from the disturbance variable d to the input variable y, the transfer function from the reference signal r to the input variable y is $H_{r \mapsto y} = G_p(1-Q)^{-1}(1+G_p(1-Q)^{-1}C_{BQ}\ H_{y \mapsto y_e})^{-1}C_F$, wherein $H_{r \mapsto y}$ represents the transfer function from the reference signal r to the input variable y, $G_p$ represents an input-output relation of a real controlled object, $C_{BQ}$ represents a vector of each of the feedback controller and the generalized filter, $C_{BQ} := (C_B\ Q)$, and $H_{y \mapsto y_e}$ represents the transfer function from the input variable y to the controlled output vector $y_v$; and the transfer function from the disturbance variable d to the input variable y is $H_{d \mapsto y} = G_p(1+G_p(1-Q)^{-1} C_{BQ}H_{y \mapsto y_e})^{-1}$, wherein $H_{d \mapsto y}$ represents the transfer function from the disturbance variable d to the input variable y.

18. A design method of a generalized disturbance rejection controller (GDRC), comprising:

determining a nominal model of a controlled object;

adjusting parameters of an inner-loop estimation controller in a generalized estimator (GE) according to the nominal model of the controlled object;

docking an input terminal of the well-adjusted GE with an output interface of the controlled object, and docking an output terminal of the well-adjusted GE with an input interface of an outer-loop controller, thereby completing structural configuration of the GDRC; and adjusting parameters of the outer-loop controller to obtain the well-adjusted GDRC, wherein the determining a nominal model of a controlled object specifically comprises;

obtaining a nominal model $$G_{n1} = \frac{s+1}{s^2 + 2.5s + 1}$$

when the controlled object is a minimum-phase electromechanical system $$G_{p1} = \frac{s+3}{s^2 + 5s + 4}$$

having a relative order of 1, wherein $G_{p1}$ presents an input-output relation of the minimum-phase electromechanical system, $G_{n1}$ represents a transfer function of a corresponding nominal model in the $G_{p1}$, and s represents a differential operator;

obtaining a nominal model $$G_{n2} = \frac{0.8(-0.1s+1)}{(3s+1)(1.5s+1)}e^{-0.5s}$$

when the controlled object is a non-minimum-phase electromechanical system $$G_{p2} = \frac{0.8(-0.1s+1)}{(3s+1)(1.5s+1)}e^{-0.5s}$$

having a relative order of 1, wherein $G_{p2}$ represents an input-output relation of the non-minimum-phase electromechanical system, and $G_{n2}$ represents a transfer function of a corresponding nominal model in the $G_{p2}$;

obtaining a nominal model $$G_{n3} = \frac{1}{(1+s)(1+0.2s)}$$

when the controlled object is a minimum-phase electromechanical system $$G_{p3} = \frac{1}{(1+s)(1+0.2s)}$$

having a relative order of 2, wherein $G_{p3}$ represents an input-output relation of the minimum-phase electromechanical system having the relative order of 2, and $G_{p2}$ represents a transfer function of a corresponding nominal model in the $G_{p3}$; and obtaining nominal models $$G'_{n1} = \frac{1}{1+s} \text{ and } G'_{n2} = \frac{1}{1+2s}e^{-0.1s}$$

when the controlled object is a minimum-phase cascaded electromechanical system $$G_p = \frac{1}{(1+s)(1+2s)}e^{-0.1s}$$

having a relative order of 2, wherein $G_p$ represents an input-output relation of the minimum-phase cascaded electromechanical system having the relative order of 2, $G_{n1}'$ represents a transfer function of a first-level nominal model in the cascaded electromechanical system, and $G_{n2}'$ represents a transfer function of a second-level nominal model in the cascaded electromechanical system.

\* \* \* \* \*